No. 699,097. Patented Apr. 29, 1902.
W. C. BLACK.
MILK COOLER.
(Application filed Nov. 22, 1900.)
(No Model.)
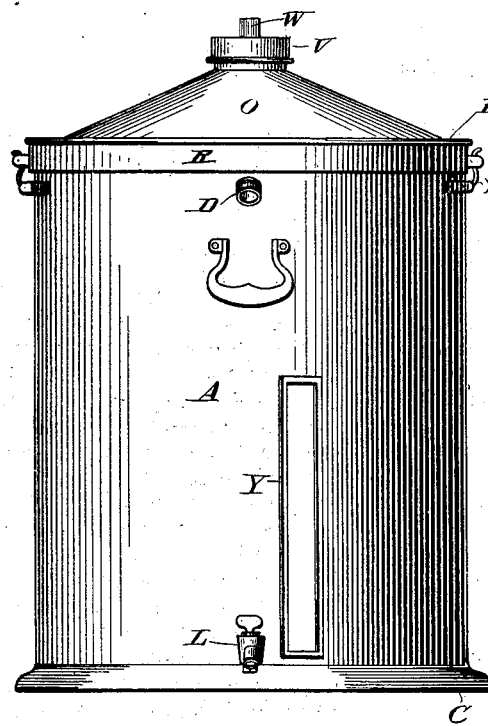
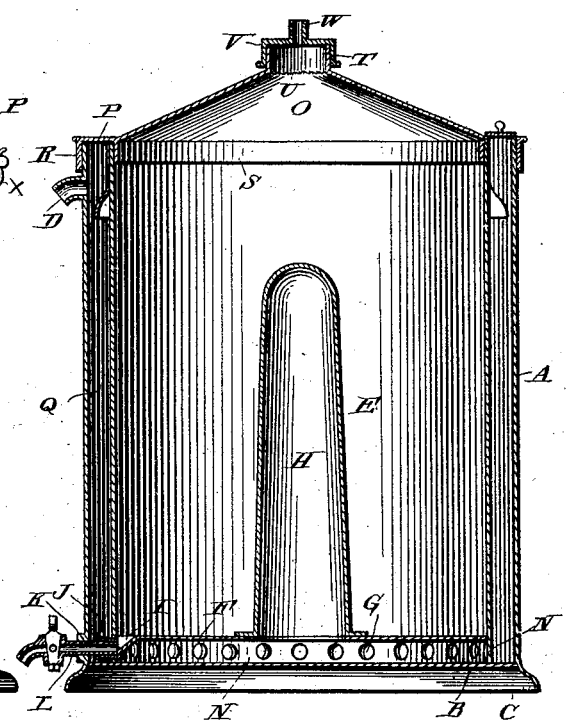
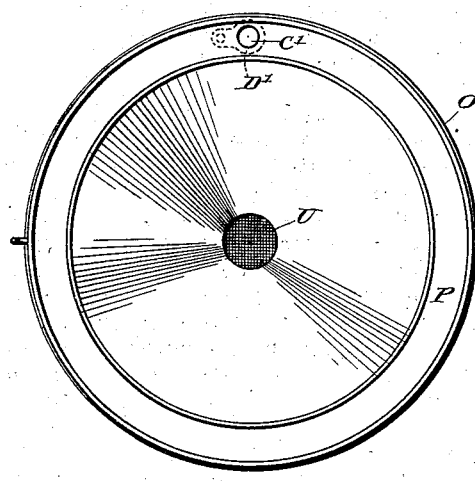
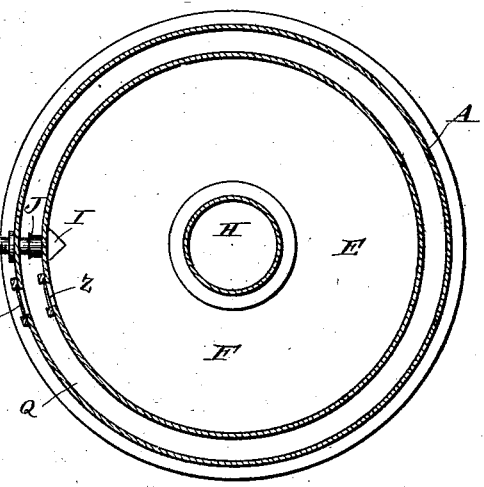
Witnesses:
Chas. E. Benedict
Louis. McCray
Inventor:
William C. Black
By Thos. E. Barrow Atty.

UNITED STATES PATENT OFFICE.

WILLIAM C. BLACK, OF MANSFIELD, OHIO, ASSIGNOR TO ELISABETH J. BLACK.

MILK-COOLER.

SPECIFICATION forming part of Letters Patent No. 699,097, dated April 29, 1902.

Application filed November 22, 1900. Serial No. 37,320. (No model.)

*To all whom it may concern:*

Be it known that I, WILLIAM C. BLACK, a citizen of the United States, residing at Mansfield, in the county of Richland and State of Ohio, have invented certain new and useful Improvements in Milk-Coolers, of which the following is a specification.

My invention relates to an improvement in apparatus for cooling milk; and the objects of my invention are to provide a means for cooling milk and to obviate the necessity of mixing cool water with the milk to accomplish the necessary result; second, to construct the milk-cooler by a combination of two cans or vessels, one placed within the other and so constructed that the inner can is removable, so that it can be easily cleansed from all impurities and prevent the same from rusting; third, to make a cheap, durable, and efficient means for the purpose stated.

In the accompanying drawings, Figure 1 is a front elevation of my improved milk-cooler as it appears when all the parts are in a normal position. Fig. 2 is a vertical sectional view to show fully the construction and arrangement of the parts. Fig. 3 is an under side view of the lid or cover. Fig. 4 is a transverse sectional view of Fig. 2, showing more fully the construction of the bottom and central vertical water-space.

Similar letters of reference indicate the several parts throughout the several views.

In the accompanying drawings, A represents the outer case or water-receptacle, which is cylindrical in form, the bottom B secured within the same, and within a short distance of the lower end of the receptacle the lower edge of the same is formed into a base-molding C. An overflow or water-discharge pipe D is secured near the upper end of the receptacle below the line of cover.

E indicates the inner or milk receptacle, which is about three inches smaller in diameter than the outer receptacle A. This is also provided about two inches from the lower end with the bottom F. The rim below the bottom is provided with perforations G. The object of the perforations is to allow the water surrounding the inner receptacle to also pass under the bottom of the same and also to fill the central vertical cone-shaped tube H. The bottom of the milk-receptacle is provided with a depression I, and in line with the same is secured the sleeve J, threaded upon the inside, a collar K, threaded upon the inside, and in which is screwed the stop-cock or spigot connection L. When the inner receptacle is placed within the outer receptacle, the stop-cock is in line with the threaded sleeve J. The stop-cock is also screwed into the said sleeve. When the two receptacles are placed in position, the upper edges line with each other. The lid or cover O is cone-shaped in the portion covering the milk-receptacle and provided with a flat rim P, projecting over the water-space Q and outer edge of the water-receptacle A. The said lid is provided upon the under side with the downwardly-projecting rims R and S. The rim R passes downward upon the outside of the outer receptacle, the rim S upon the inside of the inner receptacle. The center of the cover or lid is provided with a curb or ring T and a screen U. A lid V fits over the said curb or ring, the said lid provided with a vent-tube W. Suitable catches X are secured upon each side of the outer receptacle to hold the lid firmly in position. A transparent gage or port Y is formed in the outer and inner cases or receptacles, so they will line with each other when in a normal position. A hole C' is made in the flange P, which is covered by a slide or pivot plate D', as shown in dotted lines, Fig. 3.

The operation is as follows: Milk is placed within the inner receptacle E by straining the same through the screening U, the stop-cock L closed. Water is then poured through the opening C' to fill the water-space surrounding the inner case below the same, filling the center vertical tube H, the surplus water passing from the discharge-pipe D. The water may be supplied by wind-pump and a constant stream applied to the same. The transparent gage or port allows a ready inspection of the milk for the purpose of ascertaining whether or not all the cream has risen to the surface of the milk. When all the cream has raised, the milk is drawn from the inner receptacle through the stop-cock L. When all the milk has been removed, the stop-cock is closed, the milk removed. Another receptacle is placed under the stop-cock and the cream drawn into the same. To remove the water from the water-space, the stop-cock is unscrewed from the threaded sleeve J. The water will then pass through the stop-cock, emptying all water from the water-spaces. The inner receptacle can then be readily removed from the outer receptacle and thoroughly cleaned and dried, obviating all danger from rusting.

Having fully described my invention, what I claim as new, and desire to secure by Letters Patent, is—

1. In a milk-cooling apparatus the combination with an inner and outer receptacle, the inner receptacle to hold milk the outer receptacle for water, the inner receptacle provided with a perforated rim below the bottom, a cone-shaped central vertical tube secured in the center of the bottom of the milk-receptacle, a depression formed in the bottom of the inner receptacle, a threaded sleeve secured in the wall of the same and in line with the depression, a threaded collar secured on the outside of the water-receptacle, and in line with the threaded sleeve, a stop-cock screwed within the collar and adapted to engage with the threads in the sleeve the said cock adapted to draw the milk and cream from the inner receptacle and the water from the outer receptacle, a lid or cover cone-shaped in the center, and provided with a flange covering the water-space between the inner and outer receptacles, the said flange provided with two downwardly-projecting rims the outer rim adapted to fit over the outer receptacle, the inner rim passing inside of the milk-receptacle, the center of the cover provided with a curb or ring said ring provided with a suitable screen a cover or cap provided with a vent-tube, a transparent gage secured within the wall of the outer receptacle, and one in the wall of the inner receptacle the two placed in line with each other the lid provided with an inlet-port the outer receptacle provided with a discharge-pipe near the upper edge the inner and outer receptacles independent of each other, the inner receptacle removable from the outer receptacle, substantially as shown and described.

2. The herein-described milk-cooler comprising an outer receptacle, an inner receptacle of less diameter having a bottom and a perforated rim below said bottom, said bottom having at its edge a depression I, a collar in the rim of the inner receptacle adjacent to and communicating with said depression, a spigot passed through said collar and through the outer receptacle, a central cone-shaped tube rising from the bottom of the inner receptacle, and a cover having flanges and closing the top of the inner and outer vessels and the space between them, all substantially as shown and described and for the purpose specified.

3. The milk-cooler herein shown and described, consisting of the outer receptacle having open top and closed bottom, a discharge-spout near the top, a receptacle within said outer receptacle having a series of openings near its lower edge, a bottom above said openings having a depression at one side, a spigot leading from said depression, of the inner receptacle through the outer receptacle, a central tube rising from the raised bottom of the inner receptacle, a cover having flanges to fit snugly on the inner and outer receptacles, an inlet in said cover having a hinged cap, and a vent-tube in said cover.

In testimony whereof I affix my signature in presence of two witnesses.

WILLIAM C. BLACK.

Witnesses:
CHAS. E. BENEDICT,
LEWIS MCCRAY.